US011035282B2

(12) United States Patent
Schmale

(10) Patent No.: US 11,035,282 B2
(45) Date of Patent: Jun. 15, 2021

(54) CATALYST PROTECTION SYSTEM FROM OXYGEN DEPRIVED EXHAUST

(71) Applicant: Johnson Matthey Public Limited Company, London (GB)

(72) Inventor: Mark Schmale, Audubon, PA (US)

(73) Assignee: Johnson Matthey Public Limited Company, London (GB)

( * ) Notice: Subject to any disclaimer, the term of this patent is extended or adjusted under 35 U.S.C. 154(b) by 233 days.

(21) Appl. No.: 15/939,492

(22) Filed: Mar. 29, 2018

(65) Prior Publication Data

US 2018/0283255 A1 Oct. 4, 2018

Related U.S. Application Data

(60) Provisional application No. 62/479,425, filed on Mar. 31, 2017.

(51) Int. Cl.
| | | |
|---|---|---|
| *F01N 11/00* | (2006.01) | |
| *F01N 3/08* | (2006.01) | |
| *F01N 3/30* | (2006.01) | |
| *F01N 3/22* | (2006.01) | |
| *F01N 9/00* | (2006.01) | |

(52) U.S. Cl.
CPC ............ *F01N 11/00* (2013.01); *F01N 3/0814* (2013.01); *F01N 3/222* (2013.01); *F01N 3/225* (2013.01); *F01N 3/30* (2013.01); *F01N 9/00* (2013.01); *F01N 2550/14* (2013.01); *F01N 2560/025* (2013.01); *F01N 2900/1402* (2013.01); *Y02T 10/40* (2013.01)

(58) Field of Classification Search
CPC ... F01N 11/00; F01N 3/22; F01N 3/30; F01N 9/00; F01N 2550/00; F01N 2550/14; F01N 2560/025
See application file for complete search history.

(56) References Cited

U.S. PATENT DOCUMENTS

| | | |
|---|---|---|
| 4,175,386 A | 11/1979 | Katahira et al. |
| 5,410,872 A | 5/1995 | Adamczyk, Jr. et al. |
| 5,809,773 A | 9/1998 | Gottberg |
| 6,161,377 A | 12/2000 | Boegner et al. |
| 6,722,125 B1 | 4/2004 | Pfalzgraf |
| 2009/0104088 A1 | 4/2009 | Takagi et al. |
| 2013/0312391 A1 | 11/2013 | Cavataio et al. |
| 2013/0312407 A1 | 11/2013 | Surnilla et al. |
| 2014/0216414 A1 | 8/2014 | Kawabe et al. |
| 2015/0158019 A1 | 6/2015 | Rajaram et al. |
| 2018/0179935 A1* | 6/2018 | Matsumoto .......... H02K 7/1815 |
| 2018/0179936 A1* | 6/2018 | Matsumoto ............. F01N 3/208 |
| 2019/0271251 A1* | 9/2019 | Ukropec ............ B01D 53/9495 |

(Continued)

FOREIGN PATENT DOCUMENTS

| | | |
|---|---|---|
| DE | 19806033 A1 | 8/1999 |
| DE | 19816276 C2 | 5/2000 |

(Continued)

*Primary Examiner* — Eric S. McCall

(57) ABSTRACT

An exhaust purification system for the reduction of emissions from an exhaust stream, including an oxygen detection system; a catalyst; and an air injection system positioned between the oxygen detection system and the catalyst to inject air into the exhaust stream at designated exhaust conditions, to protect the catalyst from oxygen-deprived conditions.

12 Claims, 1 Drawing Sheet

(56) References Cited

U.S. PATENT DOCUMENTS

2020/0040796 A1* 2/2020 Yoo .................... F02D 41/1463
2020/0095916 A1* 3/2020 Haas .................... F01N 3/0807

FOREIGN PATENT DOCUMENTS

| DE | 10026359 A1 | 12/2001 |
| EP | 2933449 B1 | 2/2018 |
| JP | H0526034 A | 2/1993 |
| JP | 07133717 A | 5/1995 |
| KR | 20090063944 B1 | 6/2009 |
| WO | 2015085300 A1 | 6/2015 |

* cited by examiner

CATALYST PROTECTION SYSTEM FROM OXYGEN DEPRIVED EXHAUST

BACKGROUND

The need to reduce the emission of harmful byproducts and the ever-increasing pressures to increase fuel economy are ongoing challenges with internal combustion engines. Diesel engines produce an exhaust emission that generally contains at least four classes of pollutant that are legislated against by inter-governmental organizations throughout the world: carbon monoxide (CO), unburned hydrocarbons (HCs), oxides of nitrogen ($NO_x$) and particulate matter (PM). A variety of emissions control devices exist for treating one or more of each type of pollutant. These emissions control devices are often combined as part of an exhaust system to ensure that all four classes of pollutant are treated before emission of the exhaust gas into the environment.

Under certain conditions, exhaust streams may include low levels of oxygen. However, some emission control devices may include catalysts which can be damaged or inactivated in oxygen-deprived exhaust environments. Accordingly, there exists a need to protect such catalysts from oxygen-deprived conditions.

SUMMARY OF THE INVENTION

According to some embodiments of the present invention, an exhaust purification systems for the reduction of emissions from an exhaust stream may include an oxygen detection system; a catalyst; and an air injection system positioned between the oxygen detection system and the catalyst to inject air into the exhaust stream at designated exhaust conditions, to protect the catalyst from oxygen-deprived conditions. In some embodiments, the oxygen detection system comprises an oxygen sensor. The oxygen detection system may be exhaust-mounted. In some embodiments, the oxygen detection system comprises a signal originating from an engine control unit. In some embodiments, the catalyst comprises a NOx storage catalyst such as a cold start catalyst.

In some embodiments, the designated exhaust conditions comprise an exhaust stream oxygen level below a minimum oxygen level. The minimum oxygen level may comprise a level of oxygen above that required for complete combustion of all injected fuel into an engine and exhaust systems. In some embodiments, the minimum oxygen level comprises about 1 wt % oxygen or greater; or about 10 wt % oxygen. In certain embodiments, the air injection system may be operated to inject air upstream of the catalyst to prevent lambda ratios below about 1.1 within the catalyst.

According to some embodiments of the present invention, an exhaust purification system for the reduction of emissions from an exhaust stream includes an oxygen detection system; a catalyst; an air injection system positioned between the oxygen detection system and the catalyst; and a controller including instructions to inject air into the exhaust stream upon detection of exhaust stream oxygen level below a minimum oxygen level, in order to protect the catalyst from oxygen-deprived conditions.

In some embodiments, the minimum oxygen level comprises a level of oxygen above that required for complete combustion of all injected fuel into an engine and exhaust systems. In some embodiments, the minimum oxygen level comprises about 1 wt % oxygen or greater; or about 10 wt % oxygen or greater.

In certain embodiments, the controller includes instructions to inject air such that a lambda ratio above about 1.1 is maintained in the exhaust stream entering the catalyst. In some embodiments, the controller includes instructions to inject air such that an exhaust stream oxygen level entering the catalyst is maintained above a level of oxygen required for complete combustion of all the injected fuel into an engine and exhaust systems. In some embodiments, the controller includes instructions to inject air such that an exhaust stream oxygen level above the minimum oxygen level is maintained in the exhaust stream entering the catalyst. The controller may include instructions to inject air such that an exhaust stream oxygen level above about 1 wt % oxygen is maintained in the exhaust stream entering the catalyst, or such that an exhaust stream oxygen level above about 10 wt % oxygen is maintained in the exhaust stream entering the catalyst. In some embodiments, the air injection system includes a valve, and the controller includes instructions to operate the valve in response to detected exhaust stream oxygen levels.

According to some embodiments of the present invention, a method of reducing emissions from an exhaust stream includes detecting an oxygen level in the exhaust stream upstream of a catalyst; and injecting air upstream of the catalyst at designated exhaust conditions to protect the catalyst from oxygen-deprived conditions. In some embodiments, the air is injected to adjust an air-fuel ratio upstream of the catalyst. For example, the air may be injected to provide a lean air-fuel ratio in the exhaust stream entering the catalyst. In some embodiments, the designated exhaust conditions comprise a rich air-fuel ratio. In some embodiments, the air is injected to provide an exhaust stream oxygen level above the minimum oxygen level in the exhaust stream entering the catalyst. For example, air may be injected to provide an oxygen level above about 1 wt % oxygen in the exhaust stream entering the catalyst, or to provide an oxygen level above about 10 wt % oxygen in the exhaust stream entering the catalyst.

DETAILED DESCRIPTION

Figure 1:
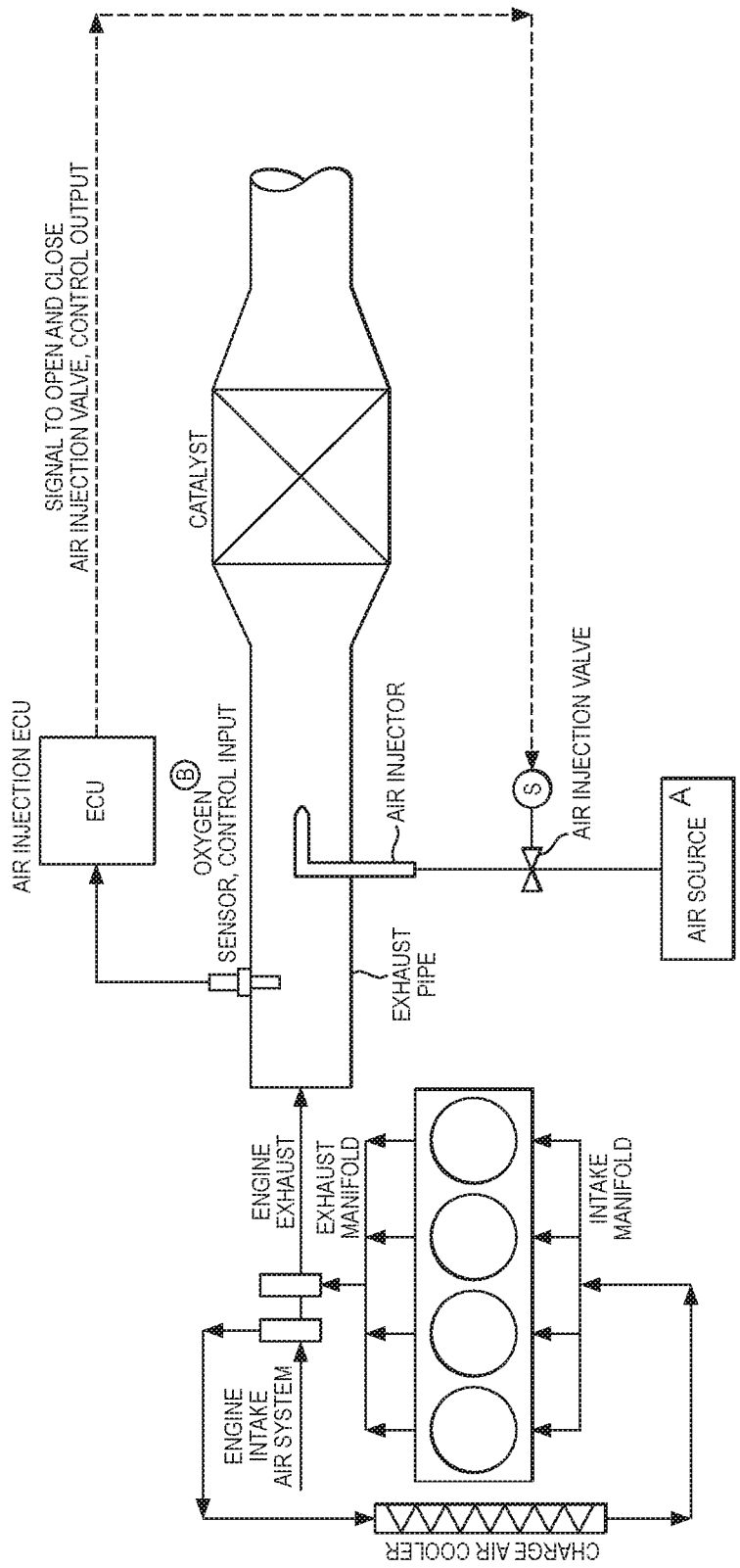
FIG. 1 depicts a system configuration of embodiments of the present invention.

Systems and methods of the present invention relate to purification of an exhaust gas from an internal combustion engine. The invention is particularly directed to cleaning of an exhaust gas from a diesel engine.

Systems and methods of the present invention include an oxygen detection system to monitor the oxygen levels in the exhaust stream, an air injection system, and one or more catalyst that is prone to long-lasting damage or deactivation when exposed to oxygen-deprived exhaust conditions. These components may work together to monitor diesel engine exhaust and, upon detecting an oxygen-deprived state in the exhaust stream, activate air injection into the exhaust stream. Such systems and methods are intended to protect catalysts that are susceptible to damage and/or deactivation when exposed to oxygen-deprived conditions. Catalyst-protection systems and methods as described herein may be useful to supplement an engine combustion control strategy to prevent rich conditions or can be used to adapt these types of catalysts to engines not originally designed to operate with them (i.e., retrofit).

As used herein, "upstream" and "downstream" are relative to the direction of exhaust flow from the engine and to the atmosphere.

Oxygen Detection System

Systems of the present invention may include an oxygen detection system, to detect and monitor the oxygen levels in the exhaust stream. Oxygen levels in the exhaust stream may be detected by any suitable method, including one or more sensors such as oxygen sensors. Oxygen sensors may be exhaust-mounted. Oxygen detection may be performed by other exhaust-mounted sensors with oxygen measurement or detection capabilities. The oxygen detection system may include a signal originating from an engine control unit, wherein oxygen levels may be calculated using inputs from sensors and/or control tables.

An oxygen sensor may measure and provide data regarding the oxygen level in the exhaust stream, which can be used to determine when to activate and/or deactivate air injection into the exhaust stream.

The oxygen detection system may be located and operated in a manner that enables detection and monitoring of the exhaust stream oxygen levels upstream of the catalyst susceptible to damage and/or deactivation when exposed to oxygen-deprived conditions.

Air Injection System

Systems of the present invention include an air injection system. Air is injected, by any suitable method, upstream of the catalyst susceptible to damage and/or deactivation when exposed to oxygen-deprived conditions. The air source may be, for example, ambient air, air from the engine intake manifold, and/or air from the vehicle's compressed air tank and/or system.

An air pump may be used to provide ambient air. Air may be injected into the exhaust stream by an injection line controlled by a valve. The valve may be controlled by a controller, which may provide instructions to inject air into the exhaust stream, and to stop air injection, based on information from the oxygen detection system. For example, upon detection of exhaust stream oxygen levels below a minimum oxygen level, the controller may provide instructions to open the valve to inject air into the exhaust stream, in order to protect the catalyst from oxygen-deprived conditions.

Catalyst

Systems of the present invention include one or more catalysts that are susceptible to damage and/or deactivation when exposed to oxygen-deprived conditions. Oxygen-deprived conditions may be defined as oxygen levels which may damage and/or deactivate one or more catalyst in the system. In some embodiments, oxygen-deprived conditions may be defined as rich air-fuel ratio conditions. In some embodiments, oxygen-deprived conditions may be defined as oxygen level below about 1 wt % oxygen in the exhaust stream entering the catalyst, or below about 10 wt % oxygen in the exhaust stream entering the catalyst.

Examples of catalysts which may be susceptible to damage and/or deactivation when exposed to oxygen-deprived conditions may include a NOx storage catalyst such as a cold start catalyst, passive NOx adsorbers, NOx traps, and the like.

NOx Storage Catalyst

NOx storage catalysts may include devices that adsorb, release, and/or reduce NOx according to certain conditions, generally dependent on temperature and/or rich/lean exhaust conditions. NOx storage catalysts may include, for example, passive NOx adsorbers, cold start catalysts, NOx traps, and the like.

Passive NOx Adsorber

Systems of the present invention may include one or more passive NOx adsorbers. A passive $NO_x$ adsorber is a device that is effective to adsorb $NO_x$ at or below a low temperature and release the adsorbed $NO_x$ at temperatures above the low temperature. A passive $NO_x$ adsorber may comprise a noble metal and a small pore molecular sieve. The noble metal is preferably palladium, platinum, rhodium, gold, silver, iridium, ruthenium, osmium, or mixtures thereof. Preferably, the low temperature is about 200° C., about 250° C., or between about 200° C. to about 250° C. An example of a suitable passive NOx adsorber is described in U.S. Patent Publication No. 20150158019, which is incorporated by reference herein in its entirety.

The small pore molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons. Other metals (e.g., Fe, Ti, and Ga) may be incorporated into the framework of the small pore molecular sieve to produce a metal-incorporated molecular sieve.

Preferably, the small pore molecular sieve is selected from an aluminosilicate molecular sieve, a metal-substituted aluminosilicate molecular sieve, an aluminophosphate molecular sieve, or a metal-substituted aluminophosphate molecular sieve. More preferably, the small pore molecular sieve is a molecular sieve having the Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, as well as mixtures or intergrowths of any two or more. Particularly preferred intergrowths of the small pore molecular sieves include KFI-SIV, ITE-RTH, AEW-UEI, AEI-CHA, and AEI-SAV. Most preferably, the small pore molecular sieve is AEI or CHA, or an AEI-CHA intergrowth.

A suitable passive $NO_x$ adsorber may be prepared by any known means. For instance, the noble metal may be added to the small pore molecular sieve to form the passive $NO_x$ adsorber by any known means. For example, a noble metal compound (such as palladium nitrate) may be supported on the molecular sieve by impregnation, adsorption, ion-exchange, incipient wetness, precipitation, or the like. Other metals may also be added to the passive $NO_x$ adsorber. Preferably, some of the noble metal (more than 1 percent of the total noble metal added) in the passive $NO_x$ adsorber is located inside the pores of the small pore molecular sieve. More preferably, more than 5 percent of the total amount of noble metal is located inside the pores of the small pore molecular sieve; and even more preferably may be greater than 10 percent or greater than 25% or greater than 50 percent of the total amount of noble metal that is located inside the pores of the small pore molecular sieve.

Preferably, the passive $NO_x$ adsorber further comprises a flow-through substrate or filter substrate. The passive $NO_x$ adsorber is coated onto the flow-through or filter substrate, and preferably deposited on the flow-through or filter substrate using a washcoat procedure to produce a passive $NO_x$ adsorber system.

Cold Start Catalyst

Systems of the present invention may include one or more cold start catalysts. A cold start catalyst is a device that is effective to adsorb $NO_x$ and hydrocarbons (HC) at or below a low temperature and to convert and release the adsorbed $NO_x$ and HC at temperatures above the low temperature. Preferably, the low temperature is about 200° C., about 250° C., or between about 200° C. to about 250° C. An example of a suitable cold start catalyst is described in WO 2015085300, which is incorporated by reference herein in its entirety.

A cold start catalyst may comprise a molecular sieve catalyst and a supported platinum group metal catalyst. The molecular sieve catalyst may include or consist essentially of a noble metal and a molecular sieve. The supported platinum group metal catalyst comprises one or more platinum group metals and one or more inorganic oxide carriers. The noble metal is preferably palladium, platinum, rhodium, gold, silver, iridium, ruthenium, osmium, or mixtures thereof.

The molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons.

The molecular sieve may preferably be a small pore molecular sieve having a maximum ring size of eight tetrahedral atoms, a medium pore molecular sieve having a maximum ring size of ten tetrahedral atoms, or a large pore molecular sieve having a maximum ring size of twelve tetrahedral atoms. More preferably, the molecular sieve has a framework structure of AEI, MFI, EMT, ERI, MOR, FER, BEA, FAU, CHA, LEV, MWW, CON, EUO, or mixtures thereof.

The supported platinum group metal catalyst comprises one or more platinum group metals ("PGM") and one or more inorganic oxide carriers. The PGM may be platinum, palladium, rhodium, iridium, or combinations thereof, and most preferably platinum and/or palladium. The inorganic oxide carriers most commonly include oxides of Groups 2, 3, 4, 5, 13 and 14 elements. Useful inorganic oxide carriers preferably have surface areas in the range 10 to 700 $m^2/g$, pore volumes in the range 0.1 to 4 mL/g, and pore diameters from about 10 to 1000 Angstroms. The inorganic oxide carrier is preferably alumina, silica, titania, zirconia, ceria, niobia, tantalum oxides, molybdenum oxides, tungsten oxides, or mixed oxides or composite oxides of any two or more thereof, e.g. silica-alumina, ceria-zirconia or alumina-ceria-zirconia. Alumina and ceria are particularly preferred.

The supported platinum group metal catalyst may be prepared by any known means. Preferably, the one or more platinum group metals are loaded onto the one or more inorganic oxides by any known means to form the supported PGM catalyst, the manner of addition is not considered to be particularly critical. For example, a platinum compound (such as platinum nitrate) may be supported on an inorganic oxide by impregnation, adsorption, ion-exchange, incipient wetness, precipitation, or the like. Other metals, such as iron, manganese, cobalt and barium, may also be added to the supported PGM catalyst.

A cold start catalyst of the present invention may be prepared by processes well known in the art. The molecular sieve catalyst and the supported platinum group metal catalyst may be physically mixed to produce the cold start catalyst. Preferably, the cold start catalyst further comprises a flow-through substrate or filter substrate. In one embodiment, the molecular sieve catalyst and the supported platinum group metal catalyst are coated onto the flow-through or filter substrate, and preferably deposited on the flow-through or filter substrate using a washcoat procedure to produce a cold start catalyst system.

NOx Traps

Systems of the present invention may include one or more NOx traps. NOx traps are devices that adsorb NOx under lean exhaust conditions, release the adsorbed NOx under rich conditions, and reduce the released NOx to form $N_2$.

A NOx trap of embodiments of the present invention may include a NOx adsorbent for the storage of NOx and an oxidation/reduction catalyst. Typically, nitric oxide reacts with oxygen to produce $NO_2$ in the presence of the oxidation catalyst. Second, the $NO_2$ is adsorbed by the NOx adsorbent in the form of an inorganic nitrate (for example, BaO or $BaCO_3$ is converted to $Ba(NO_3)_2$ on the NOx adsorbent). Lastly, when the engine runs under rich conditions, the stored inorganic nitrates decompose to form NO or $NO_2$ which are then reduced to form $N_2$ by reaction with carbon monoxide, hydrogen, and/or hydrocarbons (or via $NH_x$ or NCO intermediates) in the presence of the reduction catalyst. Typically, the nitrogen oxides are converted to nitrogen, carbon dioxide, and water in the presence of heat, carbon monoxide, and hydrocarbons in the exhaust stream.

The NOx adsorbent component is preferably an alkaline earth metal (such as Ba, Ca, Sr, and Mg), an alkali metal (such as K, Na, Li, and Cs), a rare earth metal (such as La, Y, Pr, and Nd), or combinations thereof. These metals are typically found in the form of oxides. The oxidation/reduction catalyst may include one or more noble metals. Suitable noble metals may include platinum, palladium, and/or rhodium. Preferably, platinum is included to perform the oxidation function and rhodium is included to perform the reduction function. The oxidation/reduction catalyst and the NOx adsorbent may be loaded on a support material such as an inorganic oxide for use in the exhaust system.

Systems

Systems of the present invention are configured to reduce emissions from an exhaust stream. A system may include an oxygen detection system, a catalyst, and an air injection system positioned between the oxygen detection system and the catalyst to inject air into the exhaust stream at designated exhaust conditions, to protect the catalyst from oxygen-deprived conditions. As described herein, the catalyst may comprise a formulation that is prone to long-lasting deactivation when exposed to oxygen-deprived exhaust conditions. For example, that catalyst may comprise a NOx storage catalyst such as a cold start catalyst, a passive NOx adsorber, NOx trap, and the like.

A system may include an oxygen detection system, a catalyst, an air injection system positioned between the oxygen detection system and the catalyst, and a controller including instructions to inject air into the exhaust stream upon detection of exhaust stream oxygen level below a minimum oxygen level, in order to protect the catalyst from oxygen-deprived conditions.

Operation of the System

Methods of reducing emissions from an exhaust stream may include detecting oxygen levels in the exhaust stream upstream of a catalyst; and injecting air upstream of the catalyst at designated exhaust conditions to protect the catalyst from oxygen-deprived conditions. In some embodiments, a controller may provide instructions for injecting air into the exhaust stream upon detection of designated exhaust conditions.

The oxygen level may be detected by an oxygen detection system, as described above, and a controller may provide instructions to an air injection system to inject air into the exhaust stream upon detection of the designated exhaust conditions, to protect the catalyst from oxygen-deprived conditions.

In some embodiments, the designated exhaust conditions include a rich air-fuel ratio. The air may be injected to adjust an air-fuel ratio upstream of the catalyst. For example, the air may be injected to provide a lean air-fuel ratio in the exhaust stream entering the catalyst. In some embodiments, air is injected such that a lambda ratio is maintained in the exhaust stream entering the catalyst of below about 1.1.

In some embodiments, the designated exhaust conditions comprise an exhaust stream level below a minimum oxygen level. In some embodiments, the minimum oxygen level comprises a level of oxygen above that required for complete combustion of all injected fuel into an engine and exhaust systems. In some embodiments, the minimum oxygen level comprises oxygen in an amount of about about 1 wt % or greater; about 2 wt % or greater; about 5 wt % or greater; about 7 wt % or greater; about 10 wt % or greater; about 15 wt % or greater; about 20 wt % or greater; about 0.5 wt % to about 20 wt %; about 1 wt % to about 18 wt %; about 1 wt % to about 16 wt %; about 1 wt % to about 14 wt %; about 1 wt % to about 12 wt %; about 1 wt % to about 10 wt %; about 0.5 wt %; about 1 wt %; about 2 wt %; about 3 wt %; about 4 wt %; about 5 wt %; about 6 wt %; about 7 wt %; about 8 wt %; about 9 wt %; about 10 wt %; about 12 wt %; about 14 wt %; about 15 wt %; about 16 wt %; about 18 wt %; or about 20 wt %.

In some embodiments, air may be injected such that an exhaust stream oxygen level above the minimum oxygen level is maintained in the exhaust stream entering the catalyst. In some embodiments, air may be injected such that an exhaust stream oxygen level entering the catalyst is maintained above a level of oxygen required for complete combustion of all the injected fuel into an engine and exhaust systems.

Additional Components

Systems of the present invention may include further components as suitable to achieve the desired emissions control for the particular exhaust stream conditions. Such components are known in the art, and may include selective catalytic reduction catalysts, reductant injectors, ammonia slip catalysts, diesel oxidation catalysts, particulate filters, and the like.

The invention claimed is:

1. An exhaust purification system for the reduction of emissions from an exhaust stream, comprising:
   a. an oxygen detection system;
   b. a catalyst; and
   c. an air injection system positioned between the oxygen detection system and the catalyst to inject air into the exhaust stream at designated exhaust conditions, to protect the catalyst from oxygen-deprived conditions;
   wherein the designated exhaust conditions comprise an exhaust stream oxygen level below a minimum oxygen level of about 10 wt % oxygen, and
   wherein the catalyst comprises a NOx storage catalyst, a cold start catalyst, or combinations thereof.

2. The system of claim 1, wherein the oxygen detection system comprises an oxygen sensor.

3. The system of claim 1, wherein the oxygen detection system is exhaust-mounted.

4. The system of claim 1, wherein the oxygen detection system comprises a signal originating from an engine control unit.

5. The system of claim 1, wherein the air injection system is operated to inject air upstream of the catalyst to prevent lambda ratios below about 1.1 within the catalyst.

6. A method of reducing emissions from an exhaust stream, comprising
   a. detecting an oxygen level in the exhaust stream upstream of a catalyst;
   b. injecting air upstream of the catalyst at designated exhaust conditions to protect the catalyst from oxygen-deprived conditions;
   wherein the air is injected to provide an oxygen level above about 10 wt % oxygen in the exhaust stream entering the catalyst, and
   wherein the catalyst is a NOx storage catalyst, a cold start catalyst, or combinations thereof.

7. The method of claim 6, wherein the oxygen level is detected by an exhaust-mounted oxygen sensor.

8. The method of claim 6, wherein the oxygen level is detected by a signal originating from an engine control unit.

9. The method of claim 6, wherein the air is injected to provide a lean air-fuel ratio in the exhaust stream entering the catalyst.

10. The method of claim 6, wherein the designated exhaust conditions comprise a rich air-fuel ratio.

11. The method of claim 6, wherein the designated exhaust conditions comprise an exhaust stream oxygen level below a minimum oxygen level.

12. The method of claim 11, wherein the minimum oxygen level comprises a level of oxygen above that required for complete combustion of all injected fuel into an engine and exhaust systems.

* * * * *